(12) United States Patent
Srivastava et al.

(10) Patent No.: US 10,948,774 B2
(45) Date of Patent: Mar. 16, 2021

(54) PHOTOALIGNED QUANTUM ROD ENHANCEMENT FILMS

(71) Applicant: The Hong Kong University of Science and Technology, Hong Kong (CN)

(72) Inventors: Abhishek Kumar Srivastava, Hong Kong (CN); Wanlong Zhang, Hong Kong (CN); Vladimir Grigorievich Chigrinov, Hong Kong (CN); Hoi Sing Kwok, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 16/094,171

(22) PCT Filed: May 10, 2017

(86) PCT No.: PCT/CN2017/083686
§ 371 (c)(1),
(2) Date: Oct. 16, 2018

(87) PCT Pub. No.: WO2017/193923
PCT Pub. Date: Nov. 16, 2017

(65) Prior Publication Data
US 2019/0129252 A1    May 2, 2019

Related U.S. Application Data (60) Provisional application No. 62/391,731, filed on May 10, 2016.

(51) Int. Cl.
*G02F 1/1335*  (2006.01)
*G02F 1/13357* (2006.01)
*G02F 1/1337*  (2006.01)

(52) U.S. Cl.
CPC .. *G02F 1/133609* (2013.01); *G02F 1/133528* (2013.01); *G02F 1/133603* (2013.01);
(Continued)

(58) Field of Classification Search
CPC ............................................. G02F 2202/01–99
See application file for complete search history.

(56) References Cited

U.S. PATENT DOCUMENTS 5,299,289 A   3/1994  Omae et al.
5,576,870 A   11/1996 Ohmae
(Continued)

FOREIGN PATENT DOCUMENTS

CN   101326453 A   12/2008
CN   103201674 A   7/2013
(Continued)

OTHER PUBLICATIONS

U.S. Appl. No. 61/631,193, Srivastava et al., filed Dec. 29, 2011.
(Continued)

*Primary Examiner* — Roy P Rabindranath
(74) *Attorney, Agent, or Firm* — Leydig, Voit & Mayer, Ltd.

(57) ABSTRACT

A photoaligned quantum rod enhancement film (QREF) includes: a substrate (802, 805); a photoalignment layer deposited on the substrate (802, 805); and a polymer layer deposited on the photoalignment layer, the polymer layer comprises a plurality of quantum rods, the plurality of quantum rods are configured to emit one or more wavelengths of light in response to pumping light, and are aligned to an alignment axis based on the photoalignment layer.

18 Claims, 9 Drawing Sheets

(52) U.S. Cl.
CPC .......... *G02F 1/133621* (2013.01); *G02F 2001/133614* (2013.01); *G02F 2001/133715* (2013.01); *G02F 2202/36* (2013.01)

(56) References Cited

U.S. PATENT DOCUMENTS

| | | | |
|---|---|---|---|
| 5,638,201 | A | 6/1997 | Bos et al. |
| 5,754,264 | A | 5/1998 | Bryan-Brown et al. |
| 5,883,687 | A | 3/1999 | Lu et al. |
| 6,188,462 | B1 | 2/2001 | Lavrentovich et al. |
| 6,821,457 | B1 | 11/2004 | Natarajan et al. |
| 7,184,615 | B2 | 2/2007 | Levola |
| 7,692,759 | B2 | 4/2010 | Escuti et al. |
| 8,902,384 | B2 | 12/2014 | Jeon et al. |
| 9,146,419 | B1 | 9/2015 | Anandan et al. |
| 2007/0069974 | A1* | 3/2007 | Kawata ............ G02F 1/133606 345/1.1 |
| 2009/0269513 | A1 | 10/2009 | Nishiyama et al. |
| 2009/0302331 | A1* | 12/2009 | Smith ............... G09G 3/3208 257/88 |
| 2009/0303421 | A1 | 12/2009 | Lee et al. |
| 2010/0104749 | A1 | 4/2010 | Zhao et al. |
| 2010/0231847 | A1 | 9/2010 | Escuti |
| 2012/0105783 | A1* | 5/2012 | Pau ........................ C09K 19/38 349/127 |
| 2013/0169909 | A1* | 7/2013 | Srivastava ........ G02F 1/133753 349/96 |
| 2014/0009902 | A1 | 1/2014 | Banin et al. |
| 2014/0204128 | A1* | 7/2014 | Jiang ................. G02F 1/133617 345/690 |
| 2014/0362556 | A1 | 12/2014 | Cho et al. |
| 2015/0155449 | A1 | 6/2015 | Kim et al. |
| 2016/0060529 | A1 | 3/2016 | Hegmann et al. |
| 2016/0187730 | A1 | 6/2016 | Du et al. |
| 2016/0351144 | A1* | 12/2016 | Park ..................... G09G 3/3648 |
| 2017/0031075 | A1* | 2/2017 | Fan .......................... F21V 9/14 |
| 2017/0153526 | A1* | 6/2017 | Okabe ..................... G02F 1/167 |
| 2017/0336684 | A1* | 11/2017 | Okazaki ............... G02F 1/1337 |
| 2018/0017829 | A1* | 1/2018 | Chae ................... G02F 1/133512 |
| 2018/0061317 | A1* | 3/2018 | Morita ................. G02F 1/13452 |
| 2018/0261783 | A1* | 9/2018 | Yun ...................... H01L 51/502 |

FOREIGN PATENT DOCUMENTS

| | | |
|---|---|---|
| CN | 104880741 A | 9/2015 |
| CN | 104992631 A | 10/2015 |
| CN | 105093677 A | 11/2015 |
| CN | 105372876 A | 3/2016 |
| CN | 105404047 A | 3/2016 |
| WO | WO 2007/032802 A2 | 3/2007 |
| WO | WO 2012/174533 A2 | 12/2012 |
| WO | WO 2013/175317 A1 | 11/2013 |
| WO | WO 2015/151092 A1 | 10/2015 |
| WO | WO 2017/024600 A1 | 2/2017 |
| WO | WO 2017/092130 A1 | 6/2017 |

OTHER PUBLICATIONS

Baker et al., "Device-Scale Perpendicular Alignment of Colloidal Nanorods," *Nano Lett.*,10: 195-201 (2010).
Baranov et al., "Assembly of Colloidal Semiconductor Nanorods in Solution by Depletion Attraction," *Nano Lett.*, 10: 743-749 (2010).
Bunning et al., "Electrically Switchable Gratings Formed Using Ultrafast Holographic Two-Photon-Induced Photopolymerization," *Chem. Mater.* 12: 2842-2844 (2000).
Chigrinov et al., "Photoalignment of Liquid Crystalline Materials: Physics and Applications" John Wiley & Sons: Chichester (2008).
Du et al., "Combination of Photoinduced Alignment and Self-Assembly to Realize Polarized Emission from Ordered Semiconductor Nanorods," *ACS Nano*, 9(11): 11049-11055 (2015).
Gu et al "Fringing-field minimization in liquid-crystal-based high-resolution switchable gratings," *Appl. Phys. Lett.* 87: 201106 (2005).
Hadar et al., "Polarization Properties of Semiconductor Nanorod Heterostructures: From Single Particles to the Ensemble," *J. Phys. Chem. Lett.*, 4(3): 502-507 (2013).
Hu et .al., "Electric-Field-Driven Accumulation and Alignment of CdSe and CdTe Nanorods in Nanoscale Devices," *Nano Lett.*, 6(11): 2585-2591 (2006).
Huang et al., "Programmable Assembly of Nanoarchitectures Using Genetically Engineered Viruses," *Nano Lett.*, 5(7): 1429-1434 (2005).
Jang et al., "White-Light-Emitting Diodes with Quantum Dot Color Converters for Display Backlights," *Adv. Mater.*, 22(28): 3076-3080 (2010).
Komanduri et al., "High efficiency reflective liquid crystal polarization gratings," *Appl. Phys. Lett.*, 95: 091106 (2009).
Kundu et al., "Ultranarrow PbS Nanorod-Nematic Liquid Crystal Blend for Enhanced Electro-optic Properties," *ACS Applied Materials & Interfaces*, 2(10): 2759-2766 (2010).
Liu et al., "A polarization insensitive 2×2 optical switch fabricated by liquid crystal—polymer composite," *Appl. Phys. Lett.*, 86: 041115 (2005).
Luo et al., "Wide color gamut LCD with a quantum dot backlight," *Optics Express*, 21(22): 26269-26284 (2013).
Luo et al., "Emerging Quantum-Dots-Enhanced LCDs," *Journal of Display Technology*, 10(7): 526-539 (2014).
Mohammadimasoudi et al., "Fast and versatile deposition of aligned semiconductor nanorods by dip-coating on a substrate with interdigitated electrodes," *Opt. Mater. Express* 3(12): 2045-2054 (2013).
Oh et al., "Achromatic diffraction from polarization gratings with high efficiency," *Opt. Lett.* 33(20): 2287-2289 (2008).
Sau et al., "Self-Assembly Patterns Formed upon Solvent Evaporation of Aqueous Cetyltrimethylammonium Bromide-Coated Gold Nanoparticles of Various Shapes," *Langmuir*, 21(7):, 2923-2929 (2005).
Sitt et al., "Highly Emissive Nano Rod-in-Rod Heterostructures with Strong Linear Polarization," *Nano Lett.*, 11: 2054-2060 (2011).
Shteyner et al., "Submicron-scale liquid crystal photo-alignment," *Soft Matter*, 9: 5160-5165 (2013).
Srivastava et al., "Fast switchable grating based on orthogonal photo alignments of ferroelectric liquid crystals", *Appl. Phys. Lett.*, 101: 031112 (2012).
Srivastava et al., "Electrically suppressed helix ferroelectric liquid crystals for modern displays," *Journal of the SID*, 23(4): 176-181 (2015).
Zhou et al., "Switchable gratings by spatially periodic alignment of liquid crystals via patterned photopolymerization," *Opt. Lett.* 31(5): 652-654 (2006).
Zhu et al., "Electrically switchable, polarization-independent diffraction grating based on negative dielectric anisotropy liquid crystal," *Appl. Phys. Lett.*, 88, 253502 (2006).
State Intellectual Property Office of the P.R.China, International Search Reporting in International Application No. PCT/CN2017/083686 (dated Aug. 7, 2017).

* cited by examiner

FIG. 5B (green light in grayscale)

FIG. 6A (red light in grayscale)

PHOTOALIGNED QUANTUM ROD ENHANCEMENT FILMS

CROSS-REFERENCE TO RELATED APPLICATIONS

This application is a U.S. National Phase application under 35 U.S.C. § 371 of International Patent Application No. PCT/CN2017/083686, filed May 10, 2017, which is a PCT application claiming the benefit of U.S. Provisional Patent Application No. 62/391,731, filed May 10, 2016, both of which are incorporated by reference in their entireties.

BACKGROUND

Quantum dot enhancement films (QDEFs), which are engineered sheets containing quantum dots, have become very popular in modern liquid crystal displays (LCDs) to provide an extended color gamut. The color gamut for modern LCDs equipped with QDEFs can go from 60-70% of the color triangle to greater than 100% of the color triangle, which is a big achievement. These sheets are widely used in displays for TVs, tablets and more. It is also reported that quantum dot displays are brighter and use less energy than other high-performance display technologies such as organic light-emitting diode (OLED) technology. However, for existing LCDs, the overall optical efficiency is still limited to 3-5%. Color filters and polarizers typically cause light losses of ~70% and ~60% respectively. To reduce or eliminate losses associated with the color filters, attempts have been made to use the concept of field sequential color display.

Recently, it has been established that semiconducting quantum dots (QDs) with a specific energy band gap, depending on the size of the particle, emit light with very pure color. Further, if the aspect ratio of QDs is increased above 1 (e.g., above 1.2), the QDs emits polarized light. The rod-shaped QDs, which are also known as quantum rods (QRs), emit polarized light that can be used to increase the efficiency of polarizers of LCDs and photonics devices. QRs are tuned to create better color by changing their size during fabrication to emit light at just the right wavelengths and give excellent color purity like QDs.

It is also expected that the aligned QR emits polarized light that can be used to improve the polarization efficiency of the modern LCDs. However, to ensure the macroscopic linear polarization of emission in thin films, QRs have to be assembled into parallel arrays. QR alignment is not an easy goal, and becomes even more difficult when a larger scale alignment for an LCD panel is considered. Examples of techniques that have been used to align QRs include: evaporation-mediated assembly electric field, template-assisted assembly and chemical bonding-directed self-assembly, among others. These methods specifically target for the long-range order of QRs, by using an external force to drive their alignment. However, most of these approaches offer very limited flexibility in the local alignment orientation, which reduces their prospects regarding large scale fabrication of LCDs.

SUMMARY

In an exemplary embodiment, the invention provides a photoaligned quantum rod enhancement film (QREF). The photoaligned QREF includes: a substrate; a photoalignment layer deposited on the substrate; and a polymer layer deposited on the photoalignment layer, wherein the polymer layer comprises a plurality of quantum rods, wherein the plurality of quantum rods are configured to emit one or more wavelengths of light in response to pumping light, and are aligned to an alignment axis based on the photoalignment layer.

In yet another exemplary embodiment, the invention provides a liquid crystal display. The liquid crystal display includes: a liquid crystal layer; a photoaligned quantum rod enhancement film (QREF) disposed below the liquid crystal layer, the photoaligned QREF comprising: a substrate; a photoalignment layer deposited on the substrate; and a polymer layer deposited on the photoalignment layer, wherein the polymer layer comprises a plurality of quantum rods, wherein the plurality of quantum rods are configured to emit one or more wavelengths of light in response to pumping light, and are aligned to an alignment axis based on the photoalignment layer; and a backlight, disposed below the photoaligned QREF.

In yet another exemplary embodiment, the invention provides a method for producing a photoaligned quantum rod enhancement film (QREF). The method includes: providing a substrate; coating a photoalignment layer onto the substrate; defining an alignment for the photoalignment layer; coating a monomer layer comprising quantum rods onto the alignment layer; and polymerizing the monomer layer.

DETAILED DESCRIPTION

Exemplary embodiments of the invention utilize photoalignment of QRs in a solid thin film, which provides flexibility in controlling both local and long-range alignment directions. Photoalignment technology, which has been widely used for the purpose of controlling liquid crystal molecular orientation, may be combined with the effect of QR self-assembly in order to achieve local alignment of QRs dispersed in liquid crystal polymer (LCP) films.

Exemplary embodiments of the invention provide a brightness enhancement film for LCDs by photoaligning QRs, which are dispersed in a polymerizable monomer film deposited on top of a photoalignment layer, so as to provide a photoaligned quantum rod enhancement film (QREF). The photoaligned QREF film is able to emit light of one or more chosen wavelengths in response to being excited by pumping light and provide an improved color gamut (similar to QDEFs). The photoaligned QREF film also provide highly desired polarized emissions, which increases the polarization efficiency of polarizers as well.

The photoalignment used to align the QRs provides good uniformity on a large scale. Additionally, the order parameter for the QR alignment (corresponding to the amount of QRs aligned in the direction of the alignment), by this approach, is sufficiently high such that a high degree of polarization is achieved with respect to the emitted light (e.g., 0.87).

Photoaligned QREF films in accordance with exemplary embodiments of the invention emit polarized light when irradiated by light (e.g., blue light). Photoaligned QREF films in accordance with exemplary embodiments of the invention further provide color enhancement similar to QDEFs, and further act as brightness enhancement films which improve color gamut and polarization efficiency.

Figure 1:
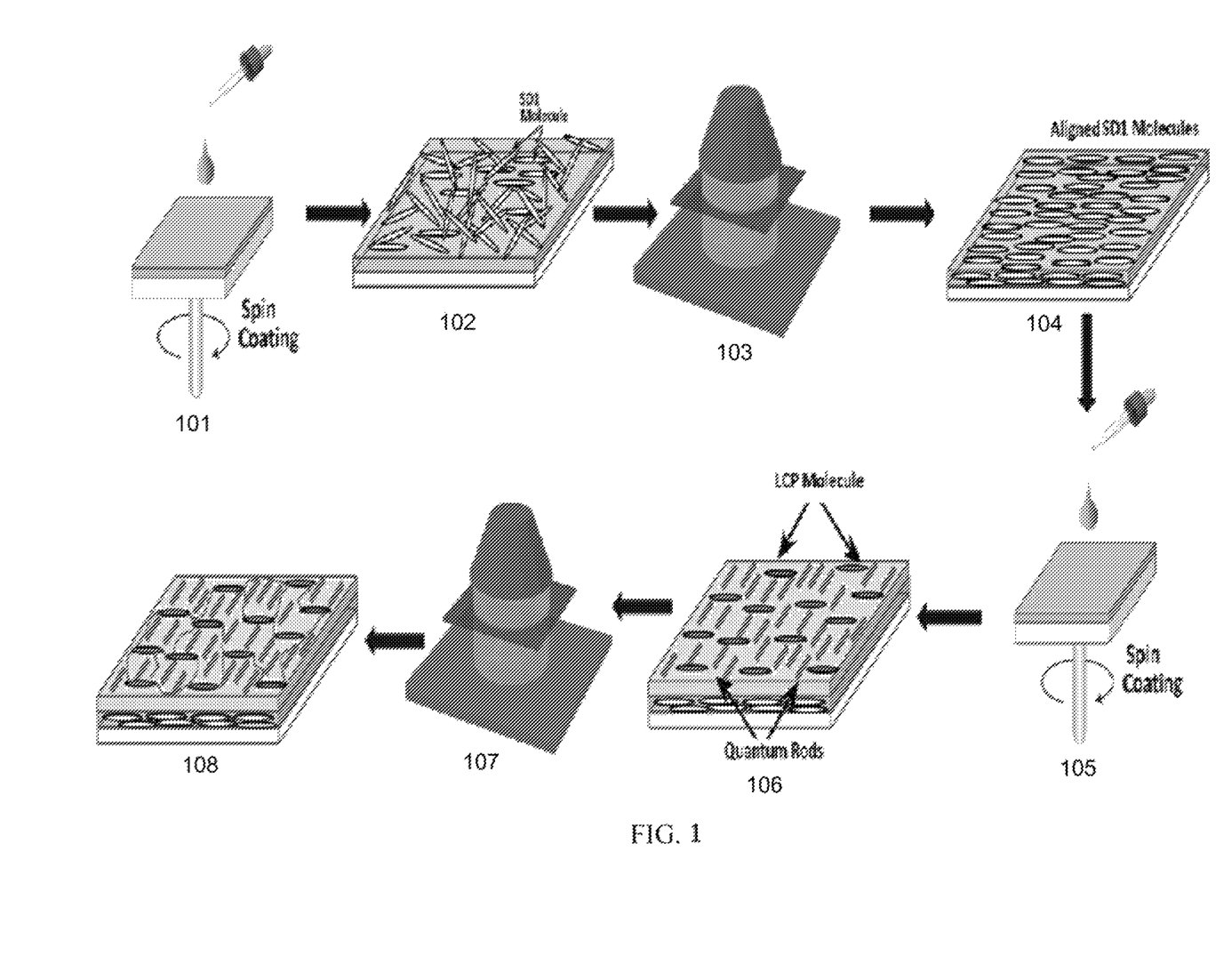
FIG. 1 depicts a schematic flowchart of a fabrication process for a brightness enhancement film including photoalignment of QRs in accordance with an exemplary embodiment of the present invention.

FIG. 1 depicts a schematic flowchart of an exemplary fabrication process for a brightness enhancement film including photoalignment of QRs in accordance with an exemplary embodiment of the present invention. At stage 101, a solvent (e.g., Dimethylformamide (referred to herein as "DMF")) containing an optimal concentration (e.g., 0.5-5% wt/wt) of azo-dye (e.g., Sulfonic azo dye Tetrasodium5,5'-((1E,1'E)-(2,2'-disulfonato-[1,1'-biphenyl]-4,4'-diyl)bis(diazene-2,1-diyl))bis (2-hydroxybenzoate) (referred to herein as "SDI")) is coated onto a substrate, so as to form an SD1 layer (see stage 102). At stage 103, the SD1 layer is irradiated by polarized light to provide a preferred direction of alignment, so as to form an SD1 alignment layer (see stage 104).

After defining the alignment direction, at stage 105, a mixture of monomer (e.g., liquid crystal monomer), photo-initiator (e.g., Igracure 541 or DMPAP), and QRs in a non-polar solvent (e.g., toluene) is coated onto the alignment layer. The concentration of the photo-initiator may be fixed, for example, to 1% wt/wt of the monomer weight in the solution, with the monomer concentration in the solution being, for example, 10-40% wt/wt. The alignment layer provides alignment for the monomer molecules and QRs of the thin film (see stage 106). The monomer molecules follow the alignment directions of the SD1 molecules of the alignment layer, whereas the QRs align perpendicular to the SD1 molecules of the alignment layer.

At stage 107, the monomer layer having the QRs is irradiated by ultraviolet light to polymerize the monomer layer, providing a photoaligned QREF that is a solid thin film having a polymer layer (e.g., an LCP layer), the alignment layer, and the substrate (see stage 108).

In other exemplary embodiments, a thermal initiator (e.g., Benzoyl peroxide or 1,1'Azobis(cyclohexanecarbonitrile)) may be used in stage 106 instead of a photo-initiator, and stage 107 would include exposure of the monomer layer to heat in order to polymerize the monomer layer (e.g., via a hot plate).

Figure 2:
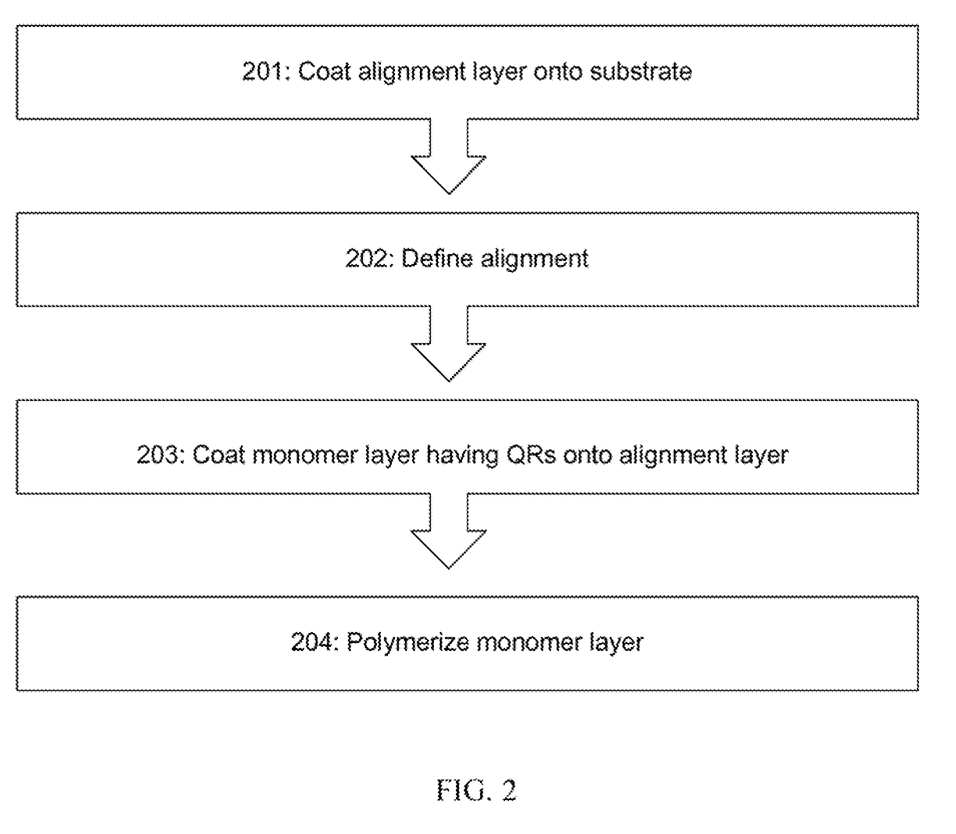
FIG. 2 depicts a flowchart of a fabrication process for a brightness enhancement film including photoalignment of QRs in accordance with an exemplary embodiment of the present invention.

FIG. 2 depicts a flowchart of a fabrication process for a brightness enhancement film including photoalignment of QRs in accordance with an exemplary embodiment of the present invention.

At stage 201, an alignment layer is coated onto a substrate. The thickness of the substrate may vary from application to application, and the alignment material that is used may provide zero pre-tilt angle, uniformity, and high anchoring energy. In an exemplary implementation, a mixture of SD1 may be spin coated onto the substrate, and the thickness of the alignment layer may be in the range of approximately 10-30 nm.

At stage 202, the alignment is defined. For example, the alignment layer may be exposed to irradiation to generate a photoalignment easy axis. In an exemplary implementation, the alignment layer is exposed to irradiating light having a wavelength of 450 nm and an intensity of 1.3 mW/cm$^2$, with the polarization azimuth of the irradiating light being perpendicular to the photoalignment easy axis.

At stage 203, a monomer layer is coated onto the alignment layer, wherein the monomer layer includes QRs. For example, a solvent containing a mixture of monomers with QRs and photo-initiator is spin coated onto the alignment layer. The thickness of the monomer layer containing the mixture of monomers and QRs may vary for different applications based on the desired brightness. In an exemplary implementation, the thickness of the monomer layer is 700 nm.

At stage 204, the monomer layer is polymerized so as to form a polymer layer. For example, the monomer layer is irradiated so as to polymerize the monomer molecules therein. In an exemplary implementation, the monomer layer is exposed to irradiating light having a wavelength of 400 nm and an intensity of 5 mW/cm$^2$.

Figure 3A:
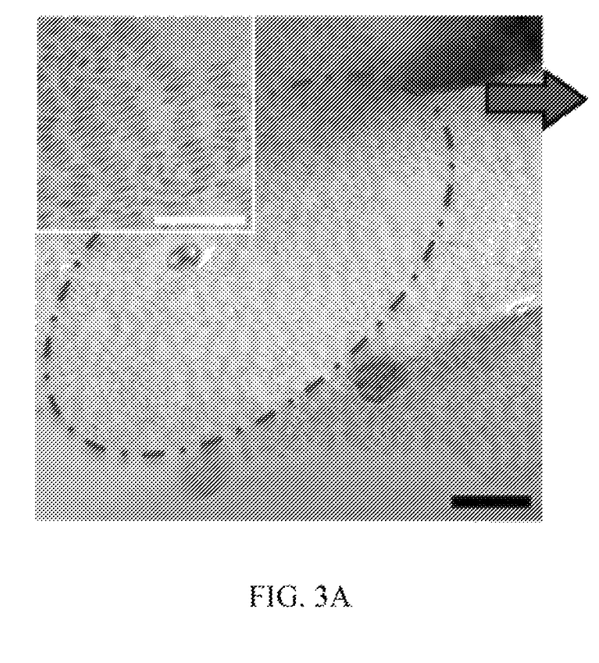
FIG. 3A is an exemplary transmission electron microscope (TEM) image for a photoaligned QREF.
Figure 3B:
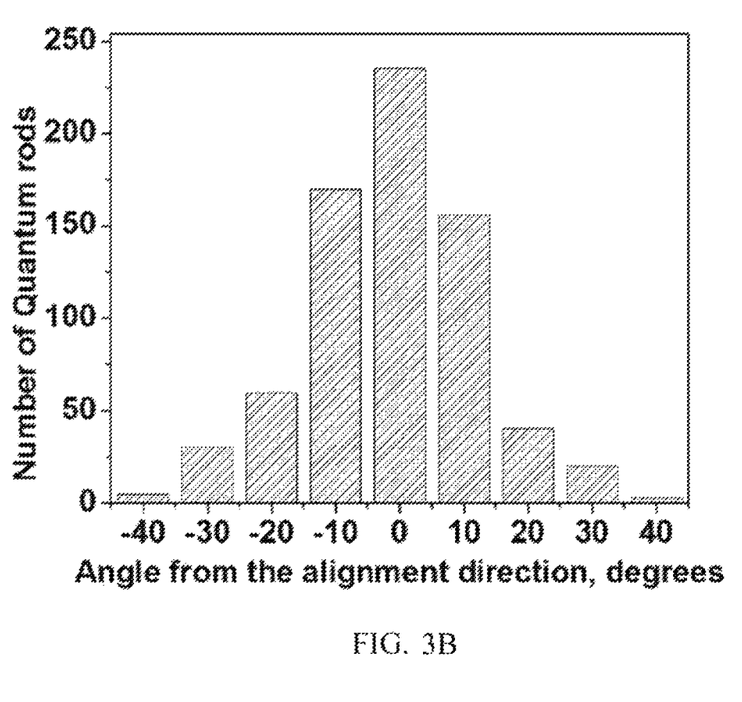
FIG. 3B is an exemplary plot showing the angular positions of QRs in FIG. 3A relative to an easy axis.

Upon completion of stage 204, the fabrication of the brightness enhancement film is complete. The brightness enhancement film is a photoaligned QREF having an LCP layer, the alignment layer, and the substrate In an exemplary implementation, photoaligned QRs dispersed in the LCP layer result in an order parameter of more than 0.87. FIG. 3A is an exemplary transmission electron microscope (TEM) image for a photoaligned QREF in an exemplary implementation. As can be seen in FIG. 3A, most of the QRs are aligned in one direction. FIG. 3B is an exemplary plot showing the angular positions of QRs in FIG. 3A relative to an easy axis.

Figure 4A:
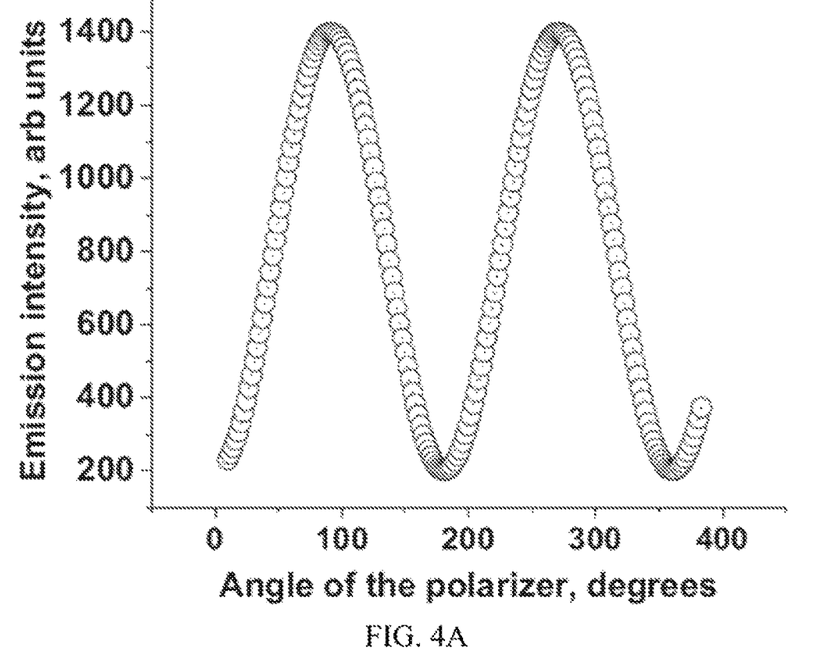
FIG. 4A is an exemplary diagram of the dependence of emission intensity on angular position of the polarization axis of a polarizer.
Figure 4B:
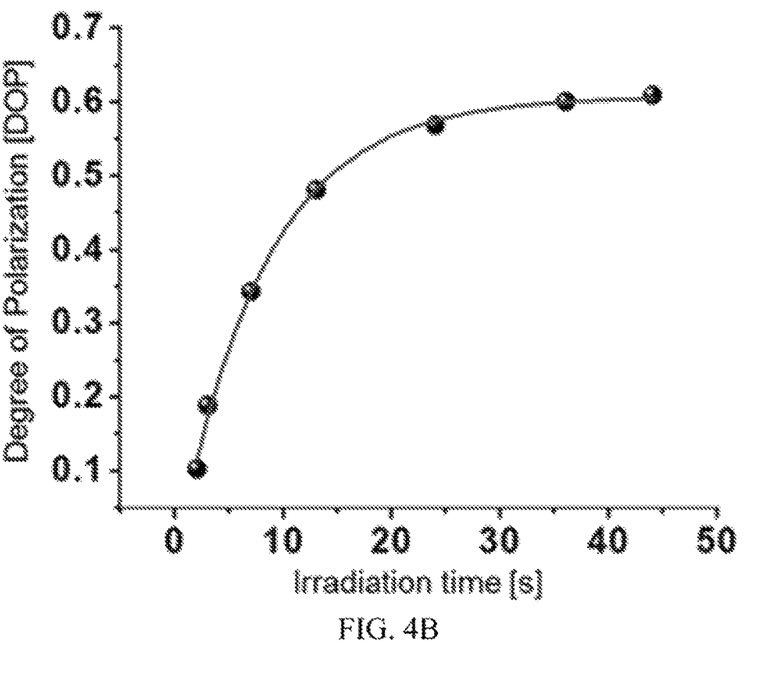
FIG. 4B is an exemplary diagram of the dependence of the degree of polarization of emitted light from a photoaligned QREF on irradiation time of SD1 photoalignment.

In an exemplary implementation, the degree of polarization (DOP) of emitted light from a photoaligned QREF is more than 0.75. FIG. 4A is an exemplary diagram of the dependence of emission intensity on angular position of the polarization axis of a polarizer. The DOP of the emitted light is greater than 0.75 with an extinction ratio greater than 7:1. The DOP of the QR emission may be calculated from the intensity transmittance parallel ($L_{//}$) and perpendicular ($I_\perp$) to the polarizer axis of the polarizer, which is defined as DOP=$(I_{//}-I_\perp)/(I_{//}+I_\perp)$. The DOP of the emitted light also depends on the irradiation doses of the photoalignment of the SD1 alignment. The anchoring energy of the SD1 alignment strongly depends on irradiation dose, and therefore, the order parameter and DOP of the photoaligned QRs also follow the same trends. FIG. 4B is an exemplary diagram of the dependence of the degree of polarization of emitted light from a photoaligned QREF on irradiation time of SD1 photoalignment.

Figures 5A, 5C:
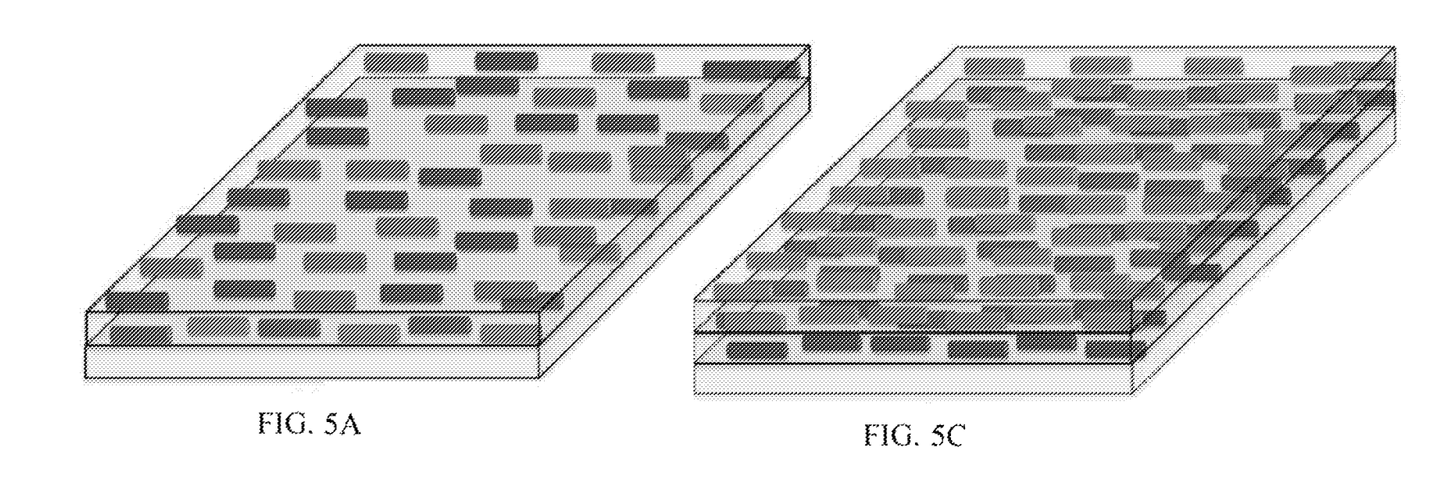
FIG. 5A is a diagram depicting two types of quantum rods mixed together in a single layer according to an exemplary embodiment of the present invention.
FIG. 5C is a diagram depicting two layers each having a different type of quantum rods deposited one over another according to an exemplary embodiment of the present invention.
Figure 5B:
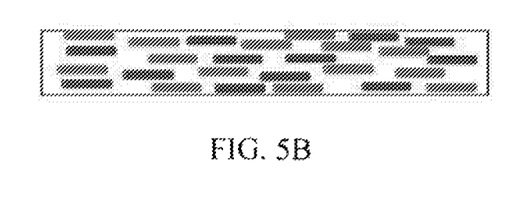
FIG. 5B is a diagram showing a cross-section of the single layer containing two types of quantum rods shown in FIG. 5A.
Figure 5D:
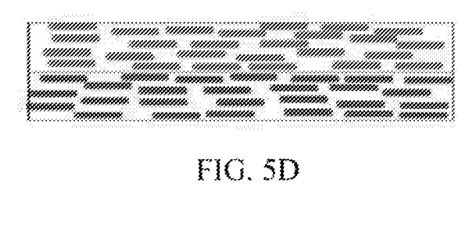
FIG. 5D is a diagram showing a cross-section of the two layers each having a different type of quantum rods shown in FIG. 5C.

FIGS. 5A-5D show two possible configurations of providing different types of QRs (green-light emitting QRs and red-light emitting QRs) in a QREF in accordance with exemplary embodiments of the invention having a blue-colored backlight, which allow for a wide color gamut and white balance to be achieved when used in a liquid crystal display. In a first exemplary configuration, as shown in FIGS. 5A and 5B, two types of QRs are mixed within a single LCP layer. In a second exemplary configuration, a first type of QRs are provided in a first LCP layer, and a second type of QRs are provided in a second layer (which may be achieved, for example, by first performing stages 105-107 of FIG. 1 for the first layer corresponding to the first type of QRs, and then repeating stages 105-107 of FIG. 1 for the second layer corresponding to the second type of QRs). With respect to the second exemplary configuration, the second LCP layer is stacked on top of the first LCP layer, and the first LCP layer provides alignment for the second LCP layer. Thus, it will be appreciated that a QREF may include multiple stacked layers of QRs or a single layer of QRs. In the exemplary embodiments utilizing a single layer of mixed green-light emitting QRs and red-light emitting QRs, the green-light emitting QRs may experience some quenching due to the red-light emitting QRs partially absorbing the green light that is emitted, and thus the concentration of red-light emitting QRs and green-light emitting QRs may be adjusted so as to take the quenching into consideration for a desired output.

Figure 6A:
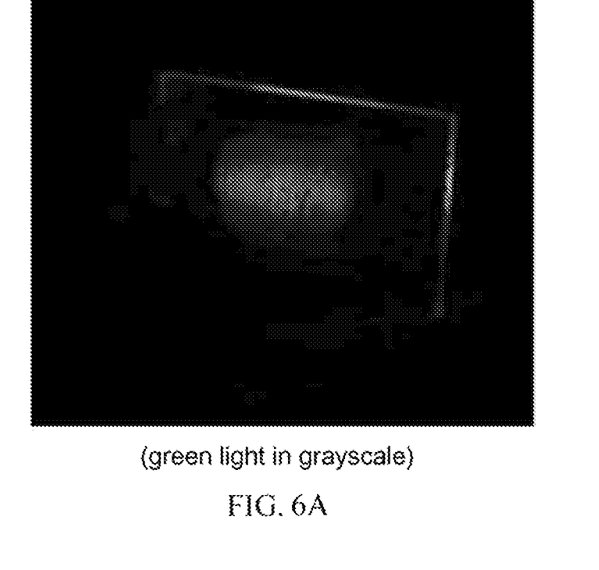
FIG. 6A is a grayscale version of an exemplary photograph of the emission from green quantum rods demonstrating the brightness enhancement achieved in an exemplary implementation.
Figure 6B:
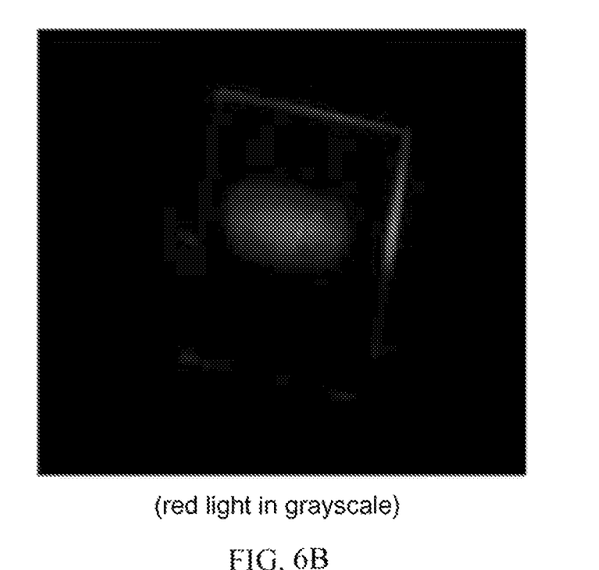
FIG. 6B is a grayscale version of an exemplary photograph of the emission from red quantum rods demonstrating the brightness enhancement achieved in an exemplary implementation.

FIG. 6A is a grayscale version of an exemplary photograph of the emission from green quantum rods demonstrating the brightness enhancement achieved in an exemplary implementation, and FIG. 6B is a grayscale version of an exemplary photograph of the emission from red quantum rods demonstrating the brightness enhancement achieved in an exemplary implementation. It will be appreciated that, the light in the original photograph corresponding to FIG. 6A is green while the light in the original photograph corresponding to FIG. 6B is red. It was demonstrated in these exemplary implementations that the photoaligned QRs offer high uniformity with respect to the light emissions.

Figure 6C:
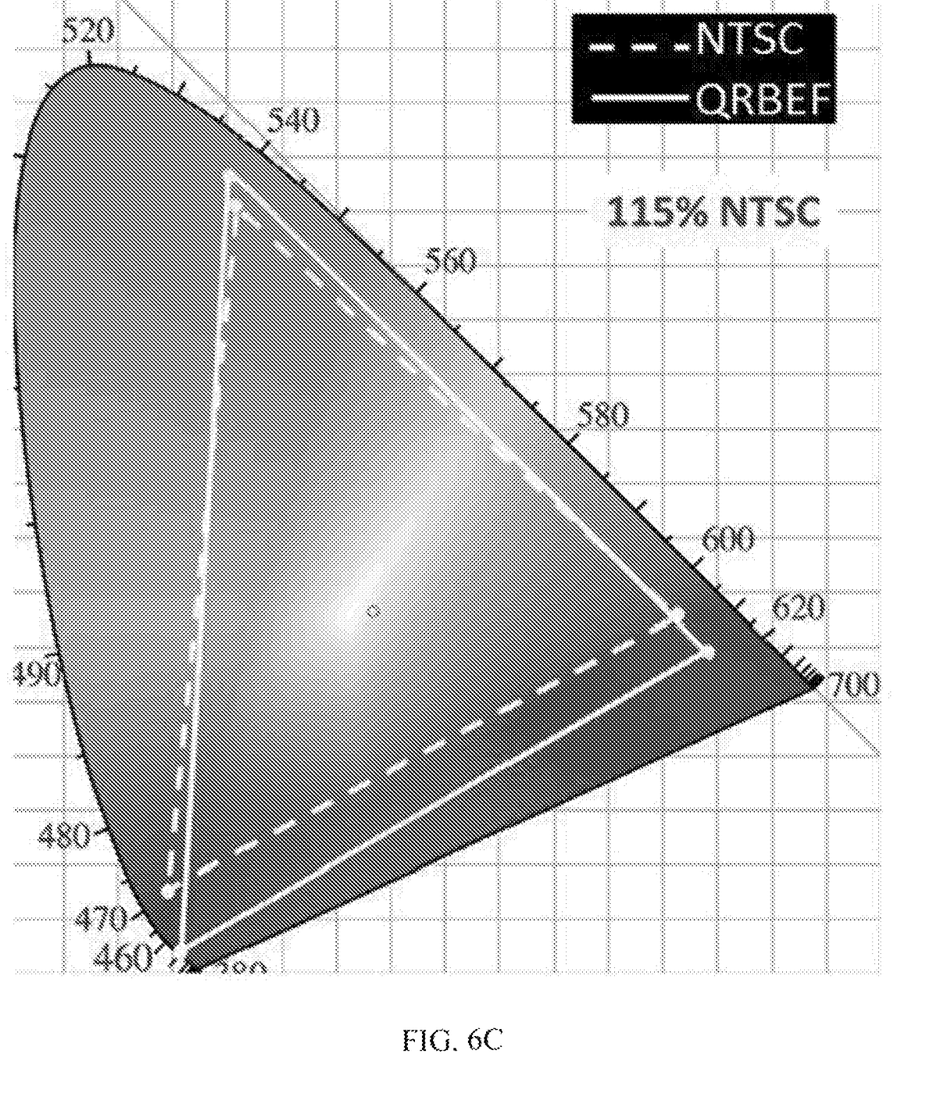
FIG. 6C is a plot comparing the color triangle corresponding to an exemplary photoaligned QREF in an exemplary implementation relative to the color triangle corresponding to NTSC standards.

FIG. 6C is a plot comparing the color triangle corresponding to an exemplary photoaligned QREF in an exemplary implementation relative to the color triangle corresponding to NTSC standards. In this exemplary implementation, the color triangle corresponding to an exemplary photoaligned QREF is more than 115% of the NTSC standards.

Figure 7:
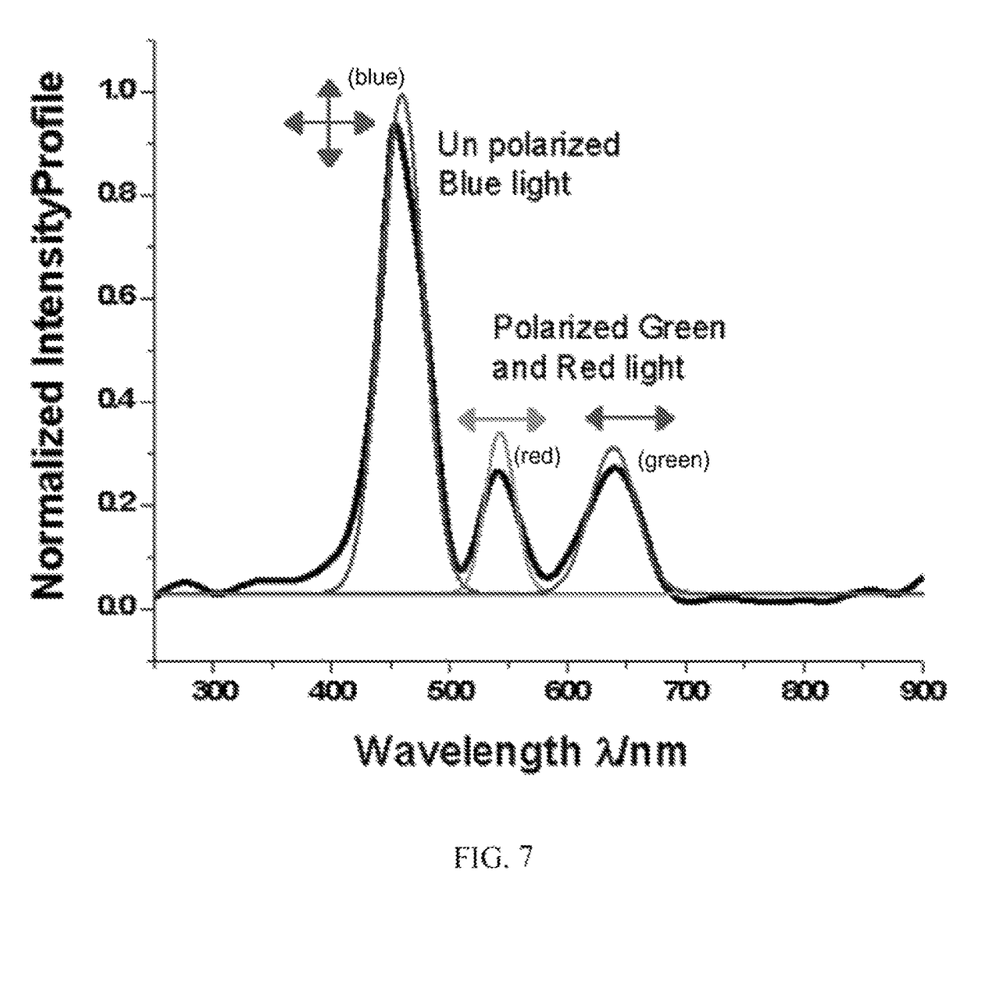
FIG. 7 is an exemplary plot of an intensity profile of a photoaligned QREF illuminated by blue light.

FIG. 7 is an exemplary plot of an intensity profile of a photoaligned QREF illuminated by blue light. In the example shown in FIG. 7, the photoaligned QREF has a multiple-layer structure (such as the exemplary structure shown in FIGS. 5C and 5D), has green-light emitting and red-light emitting QRs, and is illuminated by blue pumping light provided by a blue LED. The intensity of the blue LED allows for increasing the polarization efficiency, and the blue light is absorbed by the green-light emitting and red-light emitting QRs to provide green and red emissions. Thus, the intensity of the blue light may be adjusted to achieve perfect white balance (e.g., by increasing the blue light intensity impinging on the QREF to get sufficient red and green light emission so as to achieve white light). Given that the blue light is absorbed by the red-light emitting QRs and the green-light emitting QRs, the blue light intensity may be set to be roughly three times higher a desired white light intensity.

In an exemplary implementation, the polarization efficiency for the polarizers of a display device were determined to have increased from 40-45% to more than 55% based on utilizing a photoaligned QREF in accordance with exemplary embodiments of the invention. Thus, by utilizing photoaligned QREFs in accordance with exemplary embodiments of the invention, the overall optical efficiency of LCDs can be increased. It has also been determined that the overall efficiency of LCDs can be improved from 3-5% to 6-8% and the brightness of LCDs can be increased by 50% (relative to conventional LCDs) by utilizing photoaligned QREFs in accordance with exemplary embodiments of the invention.

Figure 8:
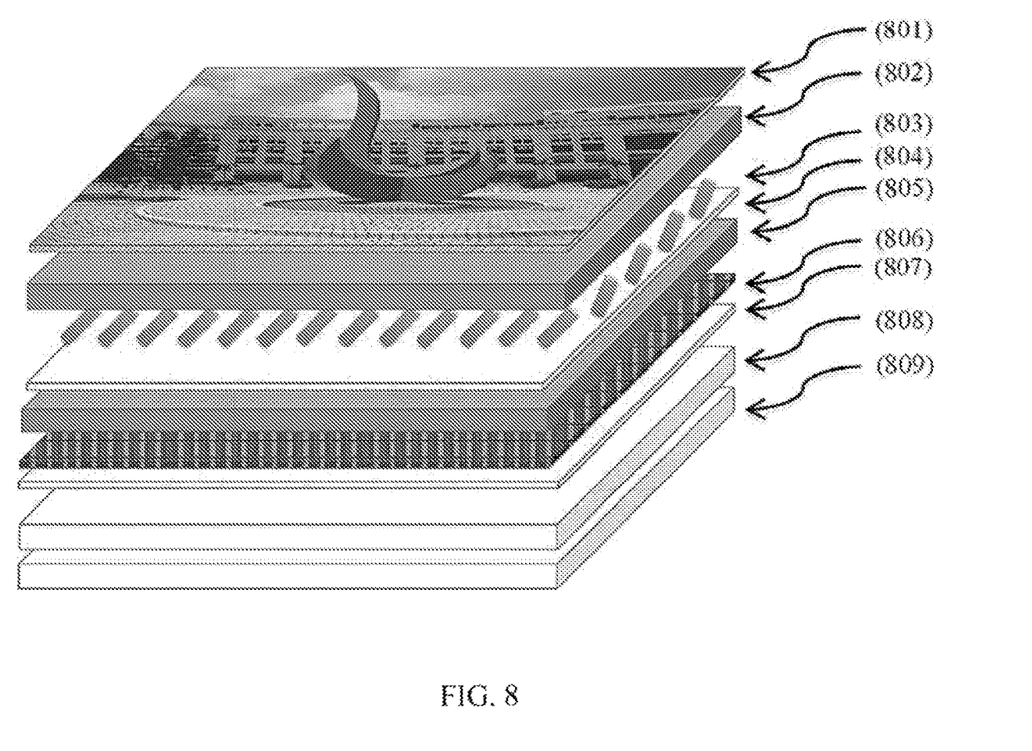
FIG. 8 is a schematic diagram of an exemplary embodiment of a liquid crystal display having a photoaligned QREF.

FIG. 8 is a schematic diagram of an exemplary embodiment of a liquid crystal display having a photoaligned QREF. As shown in FIG. 8, the liquid crystal display includes an analyzer 801, a polarizer 807, glass substrates 802 and 805, a liquid crystal layer 803, a thin-film transistor (TFT) active matrix layer 804, a color filter array 806, a photoaligned QREF 808, and a backlight unit 809.

In an exemplary embodiment, a photoaligned quantum rod brightness enhancement film includes: a plurality of quantum rods dispersed in a polymerizable monomer film deposited on top of a photoalignment layer. When excited by pumping light, the plurality of quantum rods emit light of at least one wavelength. The plurality of quantum rods include quantum rods aligned with a predetermined alignment axis defined by photoalignment. The quantum rod brightness enhancement film improves overall light efficiency of liquid crystal displays.

In a further exemplary embodiment, the photoalignment of the photoalignment layer may be created by irradiating a plurality of azo dye molecules deposited on top of the substrate. The azo dye material may be sulfonic azo dye, Tetrasodium5,5'-((1E,1'E)-(2,2'-disulfonato-[1,1'-biphenyl]-4,4'-diyl)bis(diazene-2,1-diyl))bis(2-hydroxybenzoate).

Each thin film layer may be deposited on the substrate spin coating, spray printing, ink jet printing, etc. The thin film layers may comprise at least a photo-alignment layer and a polymerizable monomer layer with dispersed quantum rods.

In a further exemplary embodiment, the irradiation dosage of the photo alignment may tune an order parameter of the aligned quantum rods and a degree of the polarization of the emitted light of the aligned quantum rods. The order parameter may be greater than 0.87 and the degree of polarization may be greater than 0.7.

In a further exemplary embodiment, the plurality of quantum rods dispersed in the polymerizable monomer in each QR layer of a QREF having multiple layers may include: quantum rods emitting a single wavelength. In another further exemplary embodiment, the plurality of quantum rods dispersed in the polymerizable monomer in the QR layer of a QREF having a single QR layer includes: a first plurality of quantum rods emitting a first wavelength and a second plurality of quantum rods emitting a second wavelength.

In a further exemplary embodiment, the quantum rods may be synthesized with certain ligands which result in alignment of the quantum rods according to the alignment of surrounding polymerizable monomer molecules. The alignment of the QRs strongly depends on the interaction between the ligands attached to the QRs and the monomer molecules. Thus, the molecular structure of the ligands and the monomer molecules may be optimized for compatibility based on chain length and intermolecular interaction forces to achieve a better quality of alignment. The polymerizable monomer may be polymerized into a solid film, fixing the alignment of the quantum rods dispersed in the polymerizable monomer. The polymerizable monomer may be a liquid crystal monomer (e.g., UCL 017 from DIC, RMM257 from Merck, etc.).

In a further exemplary embodiment, the polymerizable monomer may be mixed with photo or thermal initiators to initiate the photo or thermal polymerization, respectively. The concentration of the photo or thermal initiators may be from 1% to 40% wt/wt relative to the polymerizable monomer.

In a further exemplary embodiment, a single layer of the film may comprise multiple quantum rods with different wavelength bands. The relative concentrations of quantum rods of each wavelength band may be tuned based on the quantum yield of the respective quantum rods, and the tuning achieves a wide color triangle in reaction to the pumping light (e.g., given that some QRs may have a quantum yield of 70% while others have a quantum yield of 80%, in different exemplary implementations, the relative concentrations of the QRs may be tuned to achieve a desired white balance). In one exemplary embodiment, a concentration ratio of green quantum rods to red quantum rods is set to be 27:25.

In a further exemplary embodiment, the quantum rod brightness enhancement film may comprises multiple quantum rod layers, wherein each layer comprises a different type of quantum rods. The different layers may be disposed one over the other, and collectively provide a wide color triangle in reaction to the pumping light.

In a further exemplary embodiment, the substrate may be made of glass or plastic, and/or may be a transparent material.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A photoaligned quantum rod enhancement film (QREF), comprising:
    a substrate;
    a photoalignment layer deposited on the substrate; and
    a polymer layer deposited on the photoalignment layer, wherein the polymer layer comprises a plurality of quantum rods, wherein the plurality of quantum rods are configured to emit one or more wavelengths of light in response to pumping light, and are aligned to an alignment axis based on the photoalignment layer;
    wherein an order parameter and a degree of polarization corresponding to the plurality of quantum rods is based on an irradiation dose used for the photoalignment layer.

2. The photoaligned QREF according to claim 1, wherein the photoalignment layer comprises a plurality of azo dye molecules which have been irradiated.

3. The photoaligned QREF according to claim 2, wherein the plurality of azo dye molecules are sulfonic SD1 azo dye molecules.

4. The photoaligned QREF according to claim 1, wherein the photoalignment layer is deposited on the substrate via spin coating, spray printing, and/or ink jet printing; and
    wherein the polymer layer is deposited on the photoalignment layer via spin coating, spray printing, and/or ink jet printing.

5. The photoaligned QREF according to claim 1, further comprising:
    an additional polymer layer deposited on the polymer layer, the additional polymer layer comprising a plurality of quantum rods configured to emit one or more wavelengths different from the one or more wavelengths corresponding to the plurality of quantum rods of the polymer layer.

6. The photoaligned QREF according to claim 5, wherein one out of the plurality of quantum rods of the polymer layer and the plurality of quantum rods of the additional polymer layer are green-light emitting quantum rods, and the other out of the plurality of quantum rods of the polymer layer and the plurality of quantum rods of the additional polymer layer are red-light emitting quantum rods.

7. The photoaligned QREF according to claim 1, wherein the plurality of quantum rods are synthesized with ligands, configured to align the quantum rods with respect to an alignment of polymerizable monomer molecules of the polymer layer.

8. The photoaligned QREF according to claim 1, wherein the polymer layer was polymerized to fix the alignment of the plurality of quantum rods.

9. The photoaligned QREF according to claim 1, wherein the polymer layer is a liquid crystal polymer layer comprising polymerized liquid crystal monomers.

10. The photoaligned QREF according to claim 1, wherein the polymer layer comprises photo- or thermal initiators which facilitated polymerization of the polymer layer.

11. The photoaligned QREF according to claim 10, wherein the concentration of the photo- or thermal initiators relative to polymerizable monomers in the polymer layer is in the range of 1% to 40% wt/wt.

12. The photoaligned QREF according to claim 1, wherein the plurality of quantum rods comprise a first plurality of quantum rods configured to emit a first wavelength of light and a second plurality of quantum rods configured to emit a second wavelength of light.

13. The photoaligned QREF according to claim 12, wherein the first plurality of quantum rods are green-light emitting quantum rods, and the second plurality of quantum rods are red-light emitting quantum rods.

14. The photoaligned QREF according to claim 1, wherein the substrate is transparent.

15. A liquid crystal display, comprising:
a liquid crystal layer;
a photoaligned quantum rod enhancement film (QREF) disposed below the liquid crystal layer, the photoaligned QREF comprising:
a substrate;
a photoalignment layer deposited on the substrate; and
a polymer layer deposited on the photoalignment layer, wherein the polymer layer comprises a plurality of quantum rods, wherein the plurality of quantum rods are configured to emit one or more wavelengths of light in response to pumping light, and are aligned to an alignment axis based on the photoalignment layer; and
a backlight, disposed below the photoaligned QREF;
wherein an order parameter and a degree of polarization corresponding to the plurality of quantum rods is based on an irradiation dose used for the photoalignment layer.

16. The liquid crystal display according to claim 15, wherein the photoaligned QREF further comprises:
an additional polymer layer deposited on the polymer layer, the additional polymer layer comprising a plurality of quantum rods configured to emit one or more wavelengths different from the one or more wavelengths corresponding to the plurality of quantum rods of the polymer layer.

17. A method for producing a photoaligned quantum rod enhancement film (QREF), the method comprising:
providing a substrate;
coating a photoalignment layer onto the substrate;
defining an alignment for the photoalignment layer;
coating a monomer layer comprising quantum rods onto the photoalignment layer; and
polymerizing the monomer layer;
wherein an order parameter and a degree of polarization corresponding to the quantum rods is based on an irradiation dose used for the photoalignment layer.

18. The method according to claim 17, further comprising:
coating an additional monomer layer comprising quantum rods onto the polymerized monomer layer; and
polymerizing the additional monomer layer.

* * * * *